US012620413B2

(12) United States Patent (10) Patent No.: US 12,620,413 B2
Bennin et al. (45) Date of Patent: May 5, 2026

(54) PROFILE SHAPE CONTROL FOR GIMBAL ASSEMBLY

(71) Applicant: Magnecomp Corporation, Murrieta, CA (US)

(72) Inventors: Jeffry S. Bennin, Hutchinson, MN (US); Kuen Chee Ee, Chino, CA (US); Long Zhang, Winchester, CA (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 18/972,546

(22) Filed: Dec. 6, 2024

(65) Prior Publication Data

US 2025/0191609 A1 Jun. 12, 2025

Related U.S. Application Data

(60) Provisional application No. 63/608,576, filed on Dec. 11, 2023.

(51) Int. Cl.
*G11B 5/48* (2006.01)

(52) U.S. Cl.
CPC .......... *G11B 5/4833* (2013.01); *G11B 5/4826* (2013.01)

(58) Field of Classification Search
None
See application file for complete search history.

(56) References Cited

U.S. PATENT DOCUMENTS

| | | | | |
|---|---|---|---|---|
| 6,392,843 B1 * | 5/2002 | Murphy | .............. | G11B 5/4833 |
| | | | | 360/245.3 |
| 11,664,046 B2 | 5/2023 | Ee et al. | | |
| 11,688,421 B2 | 6/2023 | Glaess et al. | | |
| 2009/0279209 A1 * | 11/2009 | Fujimoto et al. | .... | G11B 5/4826 |
| | | | | 360/234.6 |
| 2012/0250191 A1 * | 10/2012 | Fujimoto | ............. | G11B 5/4833 |
| | | | | 360/244.2 |
| 2015/0187376 A1 | 7/2015 | Miller et al. | | |
| 2017/0330589 A1 | 11/2017 | Bjorstrom et al. | | |
| 2020/0279579 A1 * | 9/2020 | Nakayama et al. | . | G11B 5/4833 |
| 2021/0225394 A1 * | 7/2021 | Suzuki et al. | ....... | G11B 5/4833 |
| 2021/0383829 A1 * | 12/2021 | Kurebayashi et al. | ..................... | |
| | | | | G11B 5/4833 |
| 2022/0122633 A1 | 4/2022 | Zhang et al. | | |
| 2023/0117866 A1 * | 4/2023 | Nishida et al. | ...... | G11B 5/4833 |
| | | | | 29/603.03 |

(Continued)

OTHER PUBLICATIONS

International Search Report and Written Opinion in International Application No. PCT/US2024/059369, mailed Feb. 6, 2025.

*Primary Examiner* — Craig A. Renner
(74) *Attorney, Agent, or Firm* — DLA Piper LLP (US)

(57) ABSTRACT

A suspension assembly having a load beam that includes a lower surface, proximal end terminating in a hinge, a distal end, and a sag bend between the proximal end and the distal end. A base plate includes a distal end connected to the hinge. A gimbal includes a base portion that includes middle struts where proximal ends of the middle struts are welded to the load beam at locations adjacent the sag bend, and a distal end welded to the distal end of the load beam. When the middle struts are positioned in a neutral position, a gap G between an upper surface of the middle struts and a plane defined by the lower surface of the load beam does not exceed 10 μm for any point along the middle struts that are within a distance D of 0.5 mm from the sag bend.

8 Claims, 7 Drawing Sheets

(56)                    References Cited

U.S. PATENT DOCUMENTS

| | | | |
|---|---|---|---|
| 2023/0123177 A1* | 4/2023 | Senda et al. ......... | G11B 5/4833 |
| | | | 360/244.2 |
| 2023/0290373 A1* | 9/2023 | Takikawa et al. ... | G11B 5/4833 |
| 2024/0282334 A1* | 8/2024 | Kamiya et al. ...... | G11B 5/4826 |

* cited by examiner

PROFILE SHAPE CONTROL FOR GIMBAL ASSEMBLY

CROSS-REFERENCE TO RELATED APPLICATIONS

This application claims the benefit of, and priority to, U.S. Provisional Application No. 63/608,576 filed on Dec. 11, 2023, which is hereby incorporated by reference in its entirety.

FIELD OF THE INVENTION

The present disclosure relates to hard disk drives, and more particularly to a suspension assembly for hard disk drives.

BACKGROUND OF THE INVENTION

A hard disk drive (HDD) is a non-volatile storage device that stores digitally encoded data on one or more circular disks having magnetic surfaces. In operation, each disk spins rapidly. Data is read from and written to the disk using a read-write head that is positioned over a specific data track or location on the disk surface by a suspension assembly, which in turn is attached to the arm of the head stack assembly, which is rotated by a voice coil motor or actuator integral to the head stack assembly. Keeping the read-write head stable, and aligned with a targeted data track upon the disk surface defines the primary function of the suspension assembly during hard disk drive operation. Optimized suspension assembly design and manufacture can minimize the effects of mechanical, thermal, and other off-track disturbances which can degrade the performance of the hard disk drive. The suspension assembly includes a load beam. In operation, the actuator positions the distal end of the load beam over the desired portion of the disk (e.g., one of the circular tracks on the disk surface). A gimbal assembly (also referred to as a head gimbal assembly or a flexure) is mounted to the distal end of the load beam. The gimbal assembly includes components such as a slider containing the read-write head and PZT devices (piezoelectric devices) that rotate a portion of the gimbal assembly for fine positioning of the slider (as opposed to more coarse positioning of the slider by the actuator). The pressure caused by air viscosity between the slider and the spinning disk causes the slider to hover over (in close proximity to) the surface of the disk. While the load beam is relatively stiff, particularly in the lateral axis, the gimbal assembly is more flexible so that the slider can pitch and roll as it floats over the disk surface in order to maintain its operational distance immediately over the disk surface.

Dynamic load conditions within the hard drive sourced from the rotating disk, actuator positioning, enclosure cooling fans, discrete shock loading, etc. can induce large vibrational responses in the drive and suspension assembly system. Resonance is the vibrational response in both frequency and magnitude of a system resulting from external excitation imparted into the system. A mathematical transfer function can be created relating the loading excitation conditions into the systems (or input) to the resonance or vibrational response (or output). The transfer function, termed a Forced Resonance Frequency function, visualizes the location and magnitude of multiple natural or modal frequencies, denoting high energy conditions in the system represented by a collection of wave-like structural motions called mode shapes. The primary mode shapes of the suspension assembly system include load beam first bending, load beam first torsion, load beam second bending, load beam second torsion, and load beam sway etc., which are similarly represented by gimbal assembly mode shapes including gimbal first torsion, gimbal second torsion, gimbal sway, etc. Suspension assembly design factors, such as material types, material thicknesses, part length, mass, rail geometry, spring-rate, gimbal geometry, etc. all play a factor in determining the natural frequencies of a suspension assembly. An optimized suspension assembly design can either minimize the magnitude of the resonance response of each modal frequency, or increase the frequency of the resonance, and in support of optimizing the system performance of the hard disk drive.

FIG. 1 illustrates a portion of a head stack assembly 1, while FIGS. 2-3 illustrate a head suspension assembly 2, which includes a load beam 4 terminating at a proximal end with a hinge 6 that is connected to a baseplate 8. A head gimbal assembly 11, containing the slider 14 with the read/write head and gimbal 10, is mounted to the distal end of the load beam 4. The baseplate 8 is connected to an actuator arm 12 of the head stack assembly 1 (FIG. 1), which is rotated by an integral actuator (not shown). As best shown in FIG. 2, head gimbal assembly 11 comprises a gimbal 10 of thin components of layered sheet metal (e.g., stainless steel) and polymer (e.g., polyimide) on which the slider 14 is mounted (e.g., by adhesive). A circuit 16 (i.e., electrical traces) extends along the load beam 4 and head gimbal assembly 11 for electrical signal communication to and from the read/write head and PZT's.

The gimbal 10 can be attached to the load beam 4 by three welds 18, 20, 22. These welds can be spot welds between the load beam 4 and the gimbal 10. Two of the welds 18 and 20 (referred to herein as proximal welds) are located at a base portion 10a of the gimbal 10 (closer to the proximal end of the load beam 4) which includes middle struts 24, 26, where the proximal welds are located at the proximal ends of the middle struts 24, 26 of the gimbal 10. The middle struts 24, 26 can be components of the gimbal 10 with proximal ends that are welded to the load beam 4 at welds 18, 20. The third weld 22 (referred to herein as distal weld) is located at a distal end of the gimbal 10 and a distal end of the load beam 4. The outer struts 25, 27 can be components of the gimbal 10 between the middle struts 24, 26 and the third weld 22.

The gimbal 10 is configured to exhibit lower stiffness than the load beam 4 so that it can flex (especially the middle struts 24, 26 and outer struts 25, 27), which allows the slider 14 to float over the disk surface during operation. The gimbal 10 of the gimbal assembly 11 preferably tolerates the stress of large deformations during inevitable high shock events especially when the suspension is parked away from the disk during non-operation. The load beam 4 can include a sag bend 28, which is a bend or a crease of a few degrees in a middle portion of the load beam 4 (i.e., located near the proximal welds 18, 20). The sag bend 28 can be created by clamping onto one portion of the load beam 4 and pressing up on the other portion of the load beam to bend the load beam along a line to create the sag bend 28 (i.e., a bend or crease that extends along a line perpendicular to the length of the load beam). The sag bend is advantageous because it minimizes the second torsion resonance gain magnitude of the head suspension assembly 2, achieved by inducing a lateral bend across the width of the load beam 4, at a bend angle which aligns the head slider transduce gap with the longitudinal centerline rotation axis of the load beam 4 of the head suspension assembly 2 to minimize the second torsion resonance gain magnitude of the head suspension assembly 2.

There is still a need to improve upon the configuration of the load beam and middle struts to improve performance and reduce overall thickness of the combined load beam and gimbal assembly.

BRIEF SUMMARY OF THE INVENTION

The aforementioned problems and needs are addressed by a suspension assembly that includes a load beam, a base plate and a gimbal. The load beam includes a lower surface, proximal end terminating in a hinge, a distal end, and a sag bend between the proximal end and the distal end. The base plate includes a distal end connected to the hinge. The gimbal includes a base portion that includes middle struts, wherein proximal ends of the middle struts are welded to the load beam at locations adjacent the sag bend, and a distal end welded to the distal end of the load beam. Wherein, when the middle struts are positioned in a neutral position, a gap G between an upper surface of the middle struts and a plane defined by the lower surface of the load beam does not exceed 10 μm for any point along the middle struts that are within a distance D of 0.5 mm from the sag bend.

Other objects and features of the present disclosure will become apparent by a review of the specification, claims and appended figures.

DETAILED DESCRIPTION OF THE INVENTION

It has been discovered that having the initial trajectory of the middle struts extending from the proximal weld locations that tracks more closely the lower surface of the load beam provides improved resonance performance, along with a reduced overall effective thickness of the load beam and gimbal assembly. Lower gimbal resonance mode gain magnitudes result if the separation in the vertical axis (i.e., in a direction towards the disk surface) between the gimbal middle struts and the load beam is minimized. Minimizing the offset between the middle struts and the lower surface of the load beam for a longitudinal length forward of the sag bend, and similarly forward of the proximal welds, reduces the second gimbal torsional gain magnitude of the suspension assembly.

Specifically it has been discovered that controlling the offset between the planar upper surface of the gimbal middle struts, and the planar lower surface of the load beam in the vertical axis (i.e., in a direction towards the disk surface) to a value of 10 μm or less within a longitudinal length 0.5 mm forward of the sag bend, reduces the gimbal second torsional resonance mode gain magnitude of the suspension assembly. While benefit exists in placing the gimbal middle struts close to the load beam, the middle struts of the gimbal assembly still need sufficient clearance from the lower surface of the load beam to minimize or prevent contact between the middle struts and the lower surface of the load beam other than at the proximal weld locations. Controlling the offset between the gimbal middle struts and the load beam can be attained through clamping, forming, adjusting, or any similar means of processing the head suspension assembly at or near the sag bend and proximal weld locations.

Further, creating clearance between the proximal portions of the gimbal middle struts and the plane of the load beam to control the offset between the gimbal middle struts and the load beam by enabling the middle struts to effectively pass through the majority of the planar surface of the load beam after the sag bend for at least a portion of the gimbal middle strut lengths, also reduces the gimbal second torsion gain magnitude of the suspension assembly. Vertical, lateral and longitudinal clearance between the gimbal middle struts and the load beam can be created by patterning a hole, void, or through feature in the load beam material to enable the middle struts to maintain a minimal gap or separation with the load beam, or even pass through the plane of load beam lower surface. The action of enabling the gimbal middle struts to pass through the planer surface of the load beam effectively extends the length after the sag bend in which the separation in the vertical axis (i.e., in a direction towards the disk surface) between the gimbal middle struts and the load beam is minimized.

Figures 1, 2, 3:
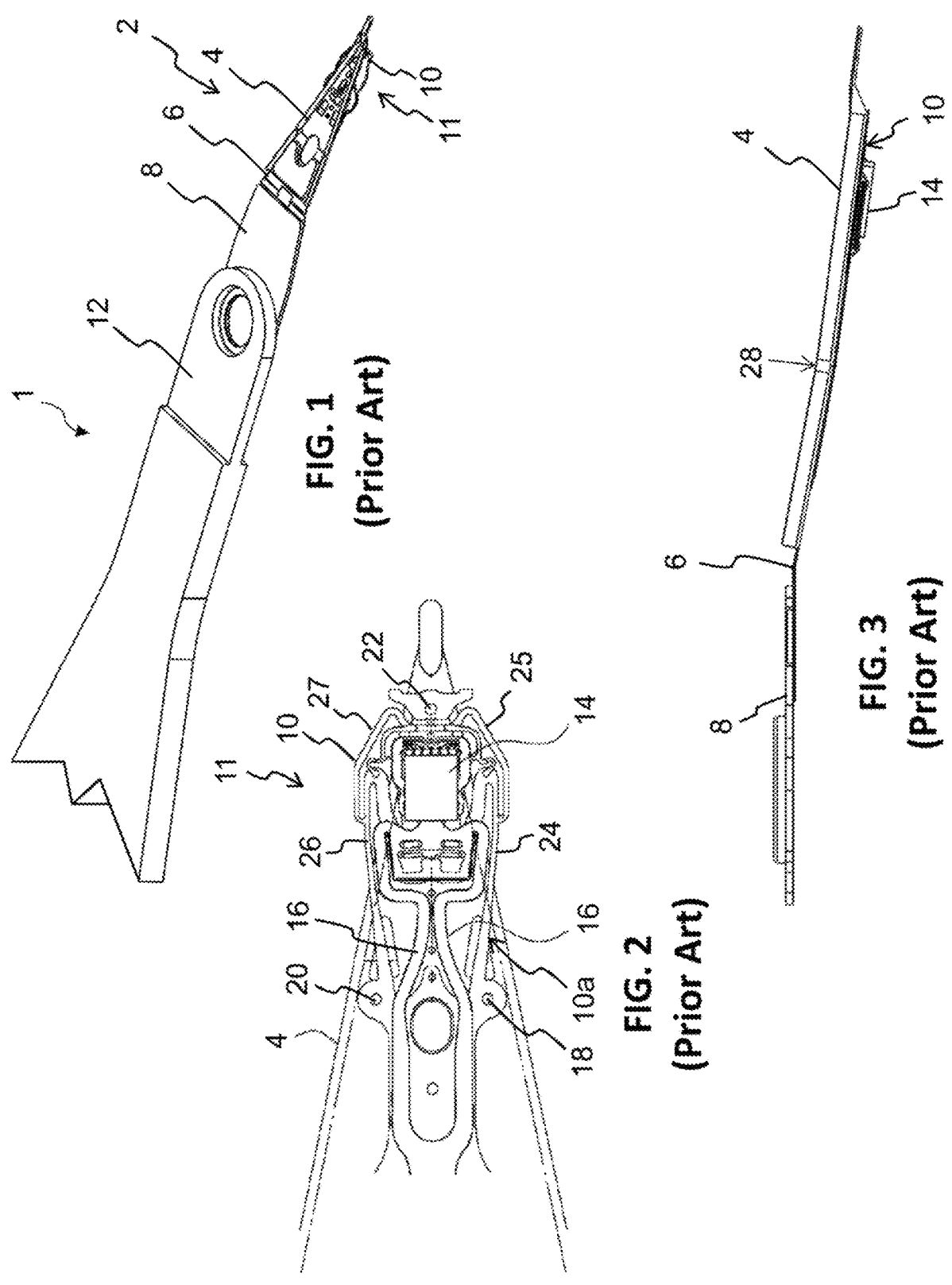
FIG. 1 is a partial perspective view of a conventional head stack assembly.
FIG. 2 is a partial bottom view of a conventional head suspension assembly.
FIG. 3 is a side view of a conventional head suspension assembly.
Figures 4, 5:
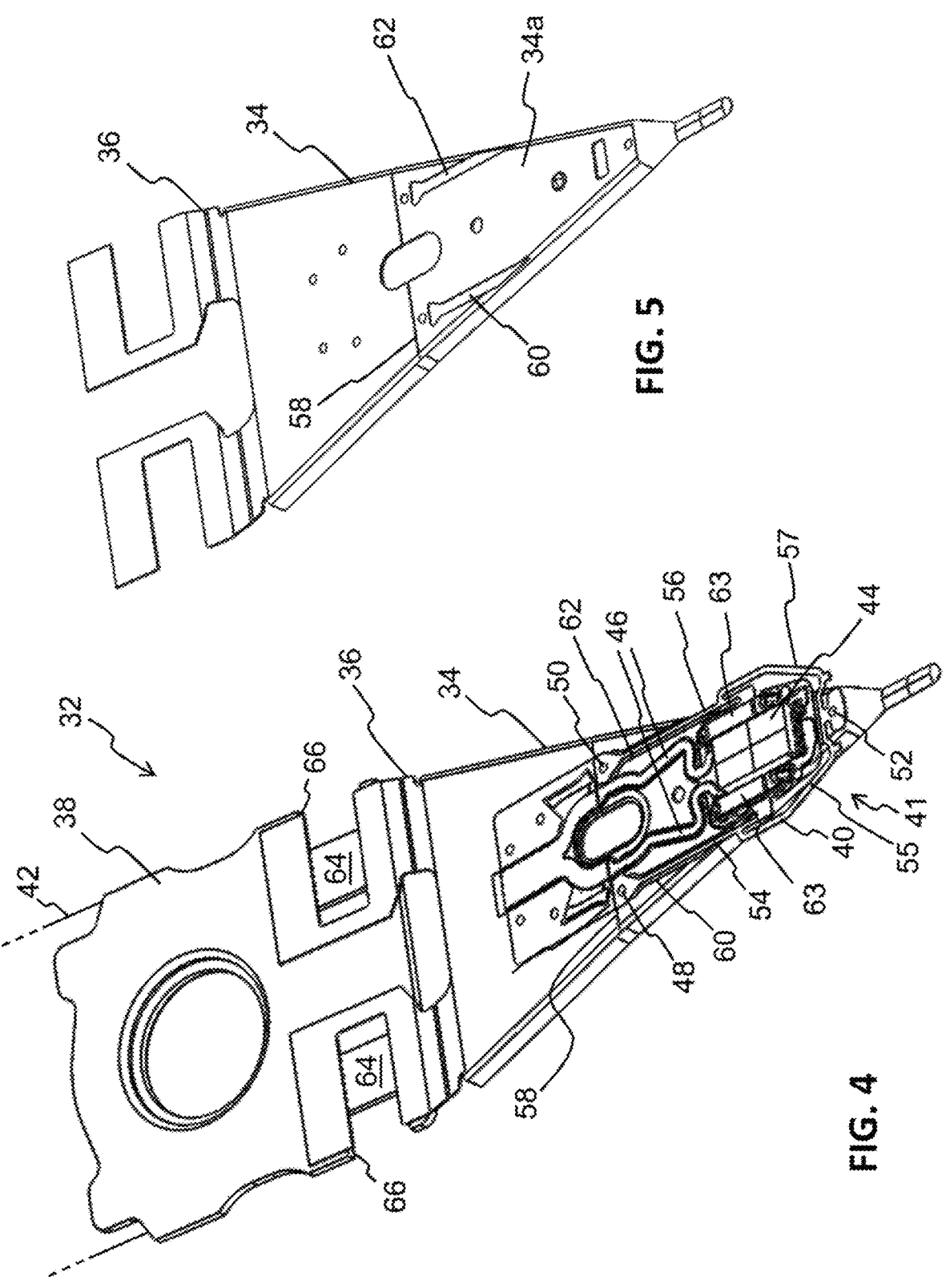
FIG. 4 is a bottom view of a first example of a head suspension assembly attached to an actuator arm of a head stack assembly.
FIG. 5 is a partial bottom view of the first example of a load beam of a head suspension assembly.

FIGS. 4-5 illustrate a first example of a head suspension assembly 32. Similar to the head suspension assembly 2 discussed above, head suspension assembly 32 includes a load beam 34, hinge 36, baseplate 38, gimbal 40 of head gimbal assembly 41, attached to an actuator arm 42, and further comprising a slider 44, circuit 46, proximal welds 48, 50, distal weld 52, middle struts 54, 56, outer struts 55, 57, and sag bend 58, generally configured as set forth above with respect to head suspension assembly 2. In addition, the lower surface 34*a* of load beam 34 includes channels 60, 62 that extend along and are aligned with middle struts 54, 56, respectively, so that the proximal portions of the middle struts 54, 56 extending from the proximal welds 48, 50 are positioned over the channels 60, 62, respectively. The channels 60, 62 can be formed by a subtractive etch of the lower surface 34*a* of the load beam 34, and extend from an area immediately adjacent the proximal welds 48, 50 (with the proximal welds 48, 50 disposed between the sag bend 58 and the beginning of channels 60, 62). Channels 60, 62 provide additional clearance to enable the proximal portions of the middle struts 54, 56 to effectively be positioned adjacent to the lower surface 34a of the load beam 34 without making contact with the load beam lower surface during operation (i.e., during operation, the proximal portions of the middle struts 54, 56 may be deflected at least partially into channels 60, 62 yet still not make contact with the load beam 34). Additionally, the proximal portions of the middle struts 54, 56 can be at least partially disposed in channels 60,62 in their neutral positions (i.e., their equilibrium positions before any deflections caused by operation) as well. Actuators 63 (e.g., piezoelectric (PZT) actuators) can be included as part of the head gimbal assembly 41 for implementing fine positioning of the slider 44 relative to the load beam 34. Actuators 64 (e.g., PZT actuators) can be included in openings 66 formed in the base plate 38, for deflecting the distal end of the base plate 38 for fine positioning of the load beam 34 (and therefore fine positioning of the slider 44) in addition to the positioning implemented by moving the actuator arm 42.

Figure 6:
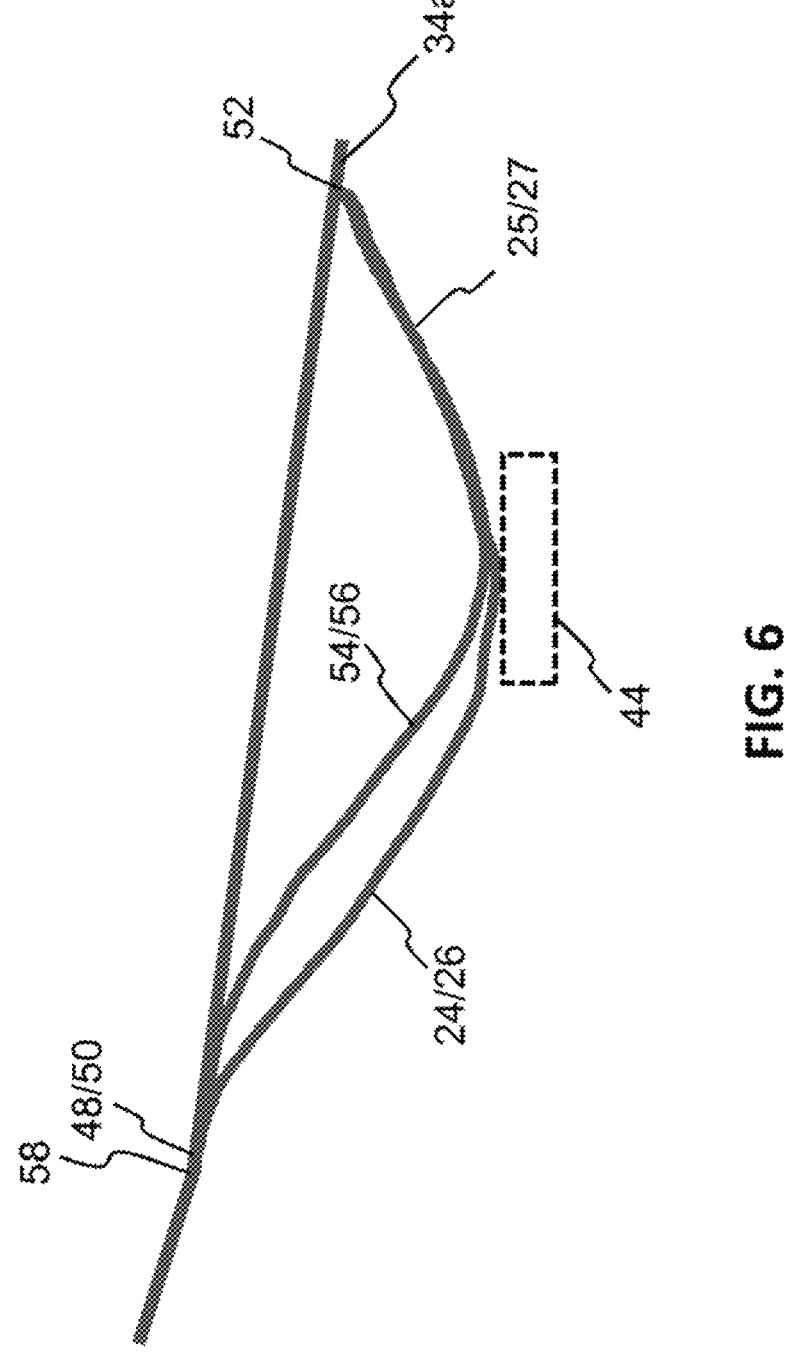
FIG. 6 is a partial side view of the load beam and gimbal of the head suspension assembly, showing plots of the profile shapes of the conventional gimbal middle struts 24, 26 of the gimbal of FIGS. 1-3 compared to the gimbal middle struts 54, 56 of the gimbal of FIGS. 4-5.

FIG. 6 illustrates the advantages of utilizing channels 60, 62 in the lower surface 34a of load beam 34. Line 34a represents the lower surface of the load beam 34, which includes a sag bend 58. Line 24/26 represents the side profile shape of conventional middle struts 24, 26 extending from the proximal welds to the distal weld without the benefit of channels 60, 62. Specifically, without channels 60, 62, the proximal portions of the middle struts 24, 26 deviate significantly from the lower surface 34a of the load beam 34 so that the proximal portions of the middle struts 24, 26 avoid contacting the lower surface 34a (which would adversely affect the flexing and operation of the head gimbal assembly). Line 54/56 represents the side profile of the middle struts 54, 56 extending from the proximal welds 48, 50 to the distal weld 52 with the benefit of channels 60, 62. Specifically, with channels 60, 62, the proximal portions of the middle struts 54, 56 can extend closer to the lower surface 34a of the load beam 34, and for a longer distance, while avoiding contact with the lower surface 34a, which results in an overall shape of the middle struts 54, 56 before the slider 44 that is positioned closer to the load beam 34. Specifically, this configuration allows the proximal portions of the middle struts 54, 56 to have an initial side profile trajectory extending from the proximal welds 48, 50 that is nearly parallel to, and therefore closer to, the load beam 34 for a longer length extending from the sag bend 58, without undue risk of the middle struts 54, 56 contacting the load beam 34 during operation.

Figure 7:
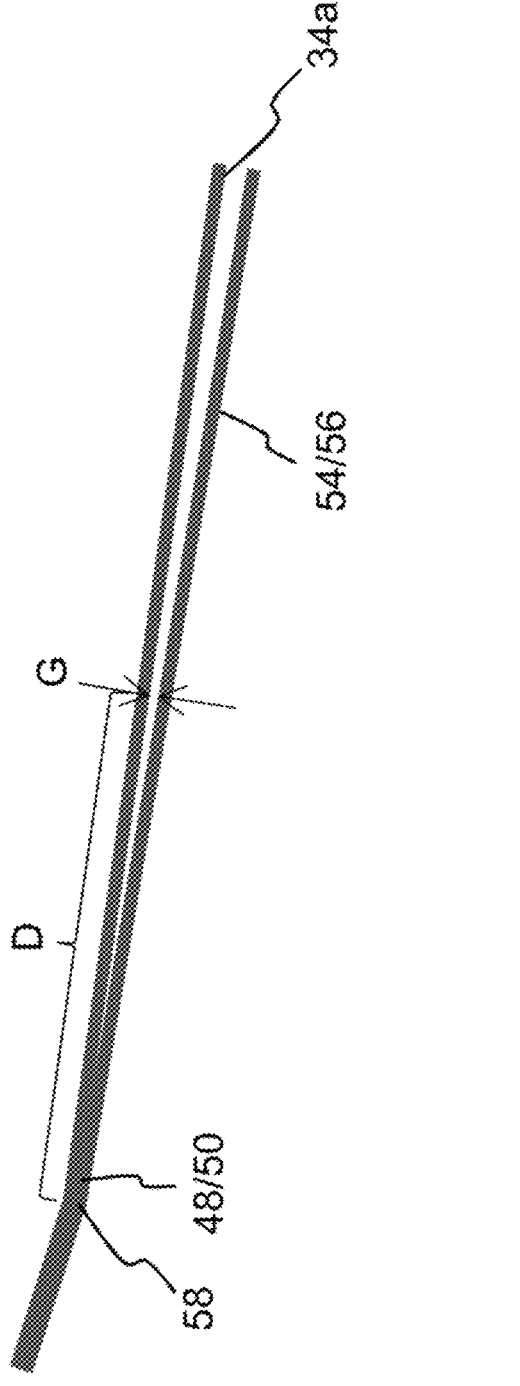
FIG. 7 is a side view of the load beam of the head suspension assembly illustrating the gap G between the middle struts and the load beam within a distance D of the sag bend.

The present inventors have discovered that this profile shape can reduce high gain oscillation modes in the head gimbal assembly 41 that can be detrimental to its performance, thereby improving resonance performance of the head suspension assembly 32. Improved performance by reducing high gain oscillation modes has been determined to result from having the proximal portions of the middle struts 54, 56 extend more closely along the lower surface of the load beam 34 for a greater length extending from the sag bend 58. Specifically, as illustrated in FIG. 7, it has been discovered by the present inventors that, with the gimbal 40 in its neutral position (i.e., its equilibrium position before any deflections caused by operation), having a gap G between the upper surface of the middle struts 54, 56 and the lower surface 34a of the load beam 34 (i.e., not including the channels 62) that does not exceed 10 μm at any points along middle struts 54, 56 within a distance D of 0.5 mm from the sag bend 58 provides a beneficial profile shape which can reduce high gain oscillation modes in the head gimbal assembly 41. This gap G within the distance D is shown in FIG. 7.

Providing channels 60, 62 in the lower surface 34a of load beam 34 allows for the middle struts 54, 56 to deflect more during operation without unwanted contact between the middle struts 54, 56 and the load beam 34 during operation. Other advantages include reduced resonance performance variation as intermittent contact conditions (where there is contact between the load beam and some but not all portions of the middle struts, due to normal process variations) would be less likely to occur. The inclusion of channels 60 provides less of a chance of contact, and yet still getting the profile change benefit, by keeping the middle struts 54, 56 closer to the load beam lower surface. However, it should be understood that improved performance can be achieved by providing gap G not exceeding 10 μm at any points along middle struts 54, 56 within a distance D of 0.5 mm from the sag bend 58 even without providing channels 60,62. Therefore, channels 60, 62 are optional. To accommodate the optional inclusion of channels 60,62, the gap G at any point along middle struts is measured as the distance between the upper surface of the middle struts 54, 56 at that point and the plane defined by the lower surface 34a of the load beam 34, such that for any given middle strut configuration, the gap G is the same irrespective of whether channels 60, 62 are included.

Figure 8:
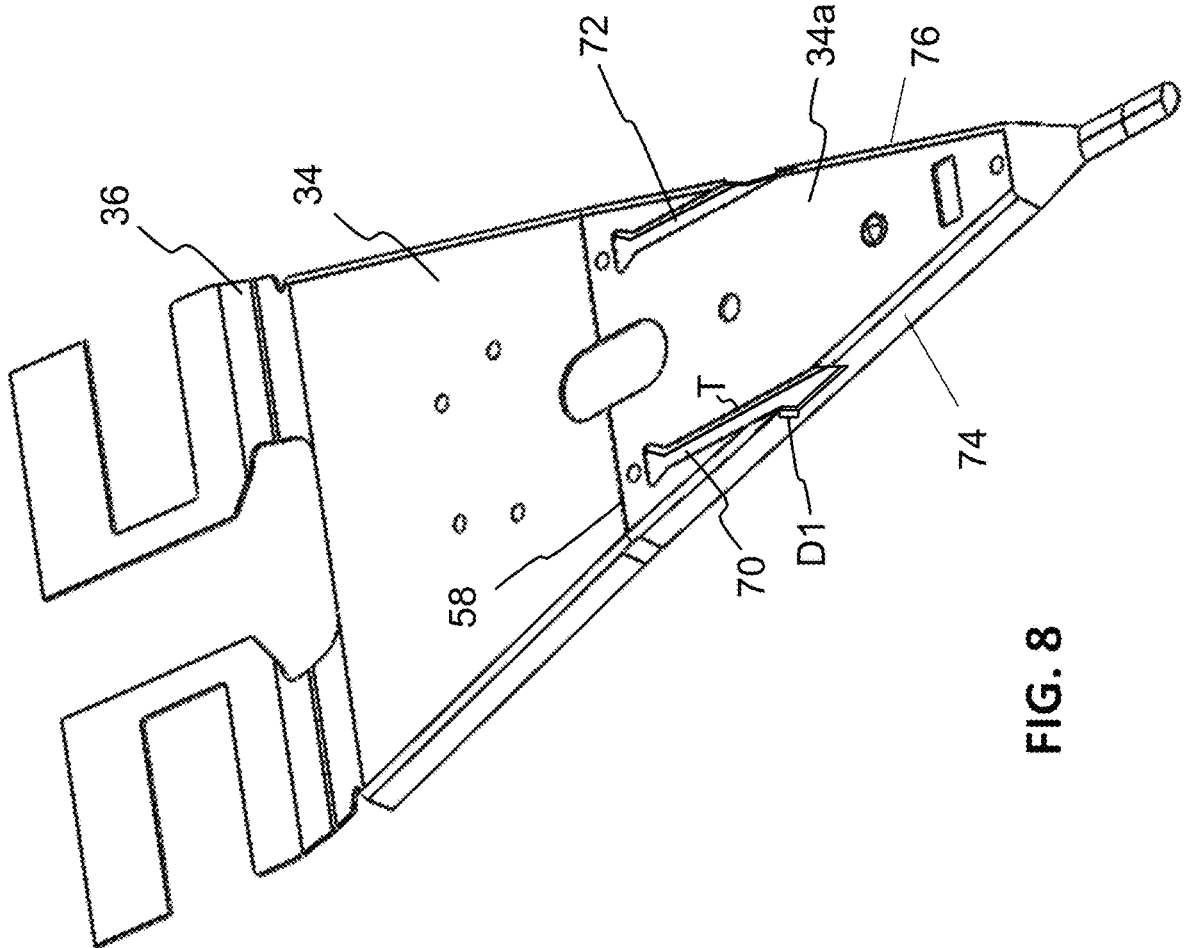
FIG. 8 is a bottom, perspective view of a second example of a load beam of a head suspension assembly.

FIG. 8 illustrates another example of load beam 34, which is the same as that shown in FIG. 5, except instead of channels 60, 62 extending into the lower surface 34a, elongated openings 70, 72 are formed through the entire thickness of the load beam 34 at the same locations so that openings 70,72 extend along and are aligned with middle struts 54, 56 (i.e., so that middle struts 54, 56 are aligned with openings 70, 72). Openings 70, 72 also extend partially into rails 74, 76 (which extend vertically from the edges of load beam 34). The openings 70, 72 can extend into the rails 74, 76 by distance D1 that is between 1 and 3 times the thickness T of the load beam 34. The openings 70, 72 not only provide additional clearance for the middle struts 54, 56 to deflect during operation without unwanted contact between the middle struts 54, 56 and the load beam 34 during operation, but they also provide access to the proximal portions of the middle struts 54, 56 adjacent to the proximal welds 48, 50 in order to perform mechanical and/or laser treatment of these proximal portions of the middle struts 54, 56 after they are welded to the load beam 34. Specifically, openings 70, 72 provide access to the sides of the proximal portions of the middle struts 54, 56 facing the load beam 34, so that the profile shape of the middle struts 54, 56 can be fine-tuned through mechanical or laser manipulation for better resonance performance.

Figures 9, 10:
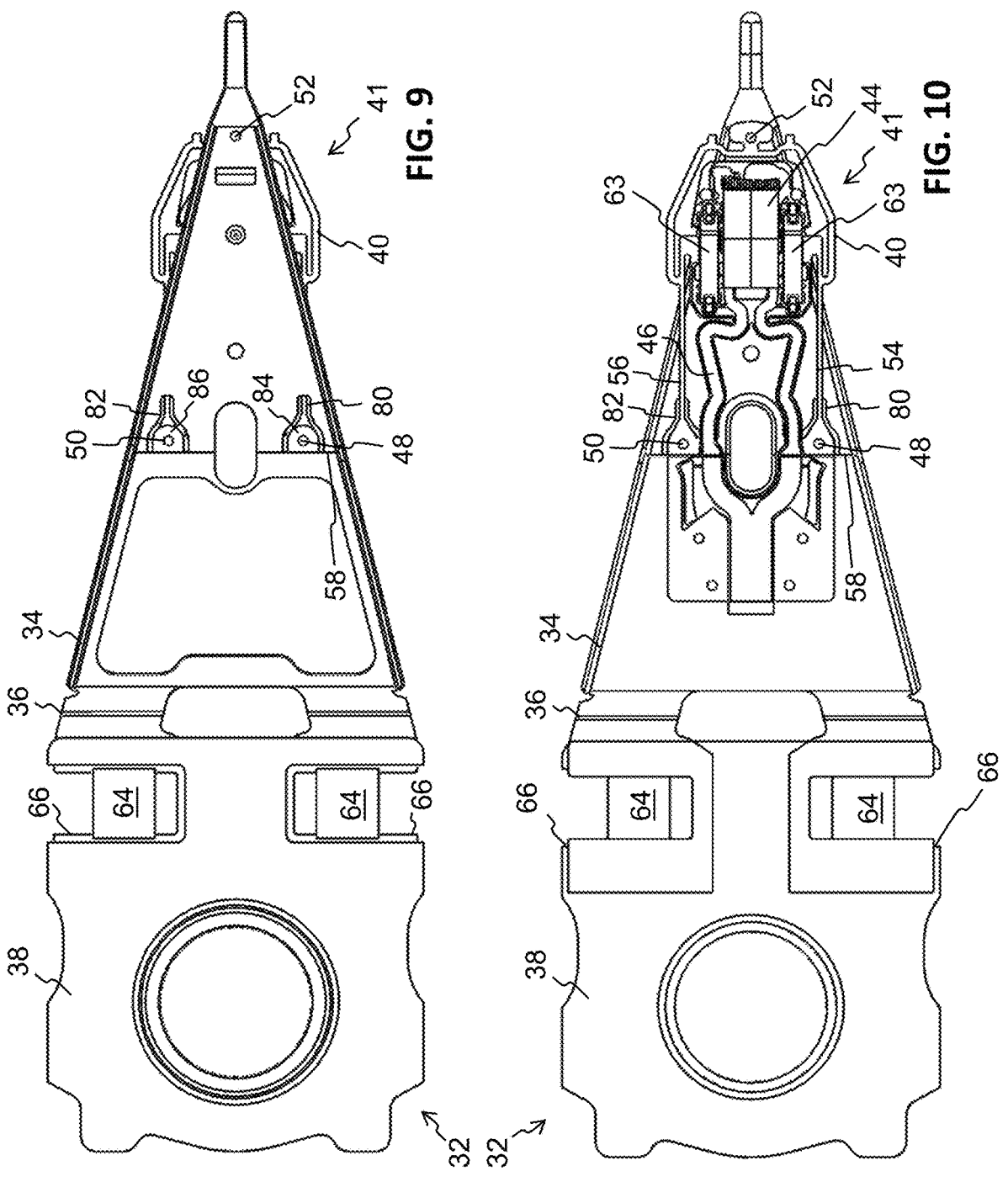
FIG. 9 is a top view of a third example of a head suspension assembly.
FIG. 10 is a bottom view of the third example of a head suspension assembly.

FIGS. 9-10 illustrate another example of a suspension assembly 32, which include most of the above described features, and additionally includes holes 80, 82 formed through the load beam 34, and tabs 84, 86 extending into holes 80, 82 respectively. The holes 80, 82 are located adjacent the sag bend 58. Proximal welds 48, 50 are located between the proximal ends of the gimbal 40 (i.e., proximal ends of the middle struts 54, 56) and the tabs 84, 86. The tabs 84, 86 can be mechanically manipulated up or down with mechanical and/or laser treatment after the proximal ends of the middle struts 54, 56 have been welded to the tabs 84, 86, so that the profile shape of the middle struts 54, 56 can be fine-tuned through mechanical manipulation of the tabs 84, 86 for better resonance performance. Having proximal welds 48, 50 on tabs 84, 86 also reduces any weld-induced stresses on the areas of the load beam 34 adjacent the tabs 84, 86. Holes 80, 82 with tabs 84, 86 can be, but need not be, combined with the channels 60 discussed above with respect to FIGS. 4-6.

Figures 11, 12:
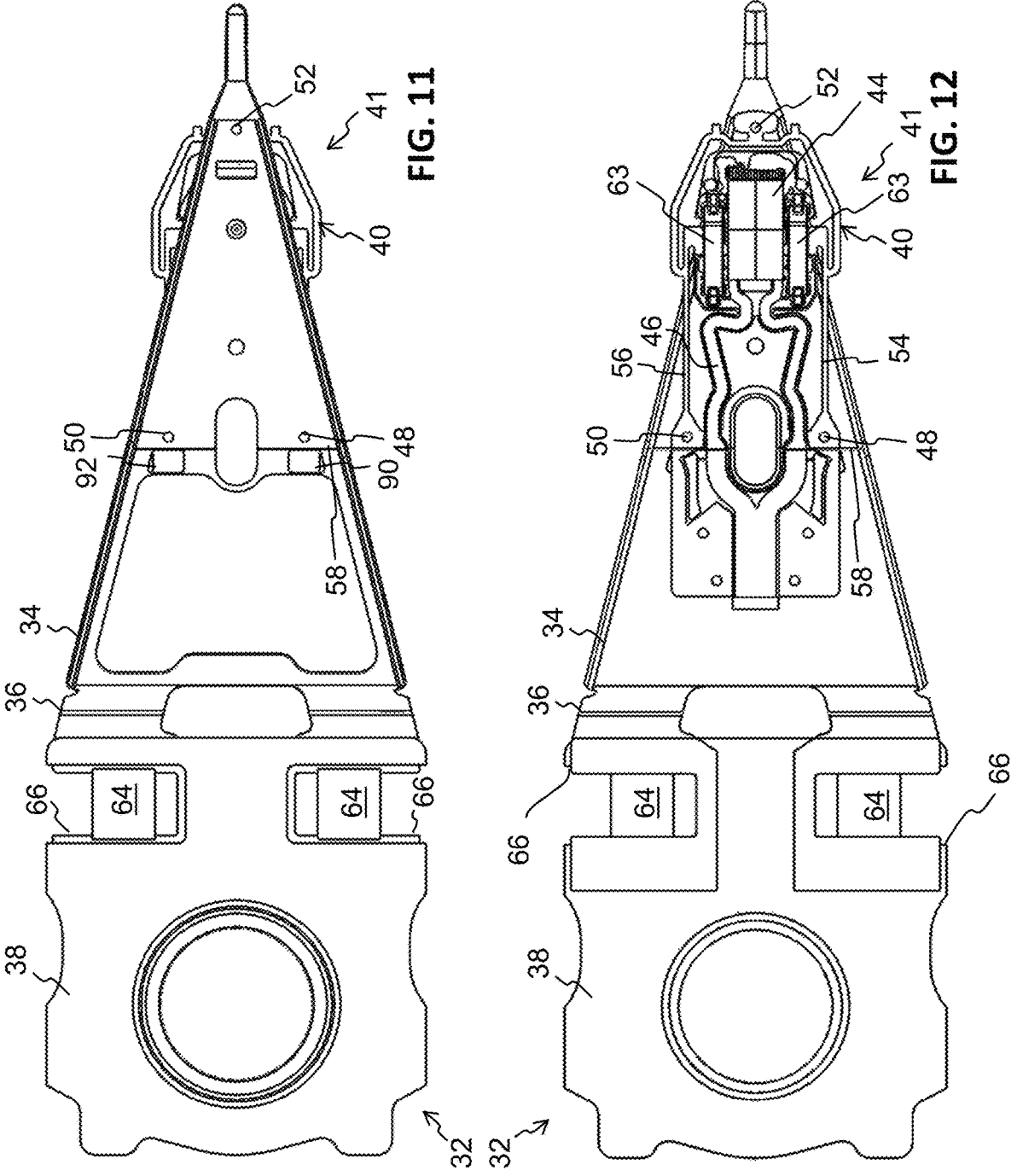
FIG. 11 is a top view of a fourth example of a head suspension assembly.
FIG. 12 is a bottom view of the fourth example of a head suspension assembly.

FIGS. 11-12 illustrate another example of a suspension assembly 32, which include most of the above described features, and additionally includes holes 90, 92 formed through the load beam 34 and are located proximal to the sag bend 58 (i.e., the sag bend 58 extends across, or along edges of, holes 90, 92). It has been discovered that forming holes 90, 92 at the crease line of the sag bend 58 relieves stress along the distal edge of the proximal welds 48, 50, thereby making the profile shape of the middle struts 54, 56 more repeatable and more capable of enabling middle struts 54, 56 to attain a closer placement to the lower surface 34a of the load beam 34, and for a longer distance extending proximally from the sag bend axis. Holes 90, 92 formed proximal to the sag bend 58 can be, but need not be, combined with the other examples of FIGS. 4-10.

It is to be understood that the present disclosure is not limited to the example(s) described above and illustrated herein, but encompasses any and all variations falling within the scope of any claims. For example, references to the present invention, embodiments or examples herein are not intended to limit the scope of any claim or claim term, but instead merely make reference to one or more features that may be covered by one or more of the claims. Materials, processes and numerical examples described above are exemplary only, and should not be deemed to limit the claims.

What is claimed is:

1. A suspension assembly comprising:
   a load beam including a lower surface, a proximal end terminating in a hinge, a distal end, and a sag bend between the proximal end and the distal end;
   a base plate including a distal end connected to the hinge; and
   a gimbal comprising:
      a base portion that includes middle struts, wherein proximal ends of the middle struts are welded to the load beam at locations adjacent the sag bend, and
      a distal end welded to the distal end of the load beam, wherein when the middle struts are positioned in a neutral position, a gap G between an upper surface of the middle struts and a plane defined by the lower surface of the load beam does not exceed 10 μm for any point along the middle struts that are within a distance D of 0.5 mm from the sag bend.

2. The suspension assembly of claim 1, further comprising:
   a slider mounted to the gimbal.

3. The suspension assembly of claim 1, further comprising:
   channels formed in the lower surface of the load beam, wherein each of the channels extends along and is aligned with one of the middle struts.

4. The suspension assembly of claim 1, further comprising:
   openings formed in the lower surface of the load beam, wherein each of the openings extends along and is aligned with one of the middle struts.

5. The suspension assembly of claim 4, wherein:
   the load beam has a thickness T;
   the load beam includes rails that extend from edges of the load beam; and
   the openings extend into the rails by a distance D1 that is between 1 and 3 times the thickness T of the load beam.

6. The suspension assembly of claim 1, wherein the load beam further comprises:
   holes formed through the load beam adjacent to the sag bend; and
   tabs extending into the holes;
   wherein the proximal ends of the middle struts are welded to the tabs.

7. The suspension assembly of claim 1, wherein the load beam further comprises:
   holes formed through the load beam adjacent to the sag bend, wherein the sag bend extends across the holes.

8. The suspension assembly of claim 1, wherein the load beam further comprises:
   holes formed through the load beam adjacent to the sag bend, wherein the sag bend extends along edges of the holes.

\* \* \* \* \*